(12) United States Patent
Zhao

(10) Patent No.: US 12,532,300 B2
(45) Date of Patent: Jan. 20, 2026

(54) AUXILIARY RESOURCE SET DETERMINING METHOD AND APPARATUS, AND STORAGE MEDIUM

(71) Applicant: Beijing Xiaomi Mobile Software Co., Ltd., Beijing (CN)

(72) Inventor: Wensu Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 324 days.

(21) Appl. No.: 18/257,060

(22) PCT Filed: Dec. 21, 2020

(86) PCT No.: PCT/CN2020/138068
§ 371 (c)(1),
(2) Date: Jun. 12, 2023

(87) PCT Pub. No.: WO2022/133665
PCT Pub. Date: Jun. 30, 2022

(65) Prior Publication Data
US 2024/0049194 A1    Feb. 8, 2024

(51) Int. Cl.
*H04W 72/0446* (2023.01)
*H04W 72/25* (2023.01)
*H04W 72/40* (2023.01)

(52) U.S. Cl.
CPC ....... *H04W 72/0446* (2013.01); *H04W 72/25* (2023.01); *H04W 72/40* (2023.01)

(58) Field of Classification Search
CPC . H04W 72/0446; H04W 72/25; H04W 72/40; H04W 4/40; H04W 74/002; H04W 74/0808; H04W 72/0453; H04W 76/14; H04W 92/18; Y02D 30/70
See application file for complete search history.

(56) References Cited

U.S. PATENT DOCUMENTS

| | | | |
|---|---|---|---|
| 2019/0124636 A1* | 4/2019 | Jiang | H04W 72/044 |
| 2020/0229171 A1* | 7/2020 | Khoryaev | H04W 4/40 |
| 2020/0280915 A1* | 9/2020 | Lu | H04L 5/16 |

FOREIGN PATENT DOCUMENTS

| | | |
|---|---|---|
| CN | 111246483 A | 6/2020 |
| WO | WO 2020209594 A1 | 10/2020 |

OTHER PUBLICATIONS

International Search Report and Written Opinion of International Application No. PCT/CN2020/138068, dated Jul. 7, 2021, 15 pages.
European Patent Office, Extended European Search Report issued in Application No. 20966246.9 dated Dec. 19, 2023, 11 pages.
Moderator, (LG Electronics), "Feature lead summary for AI 8.11. 2.2 Feasibility and benefits for mode 2 enhancements", 3GPP TSG RAN WG1 #103-e, R1-2009788, e-Meeting, Oct. 26-Nov. 13, 2020, 79 pages.

(Continued)

*Primary Examiner* — Dady Chery
(74) *Attorney, Agent, or Firm* — Finnegan, Henderson, Farabow, Garrett & Dunner, L.L.P.

(57) ABSTRACT

A method for determining an auxiliary resource set is performed by a first device, and includes: determining an auxiliary resource set, wherein the auxiliary resource set includes a part of time frequency resources in a candidate resource set sensed by the first device.

11 Claims, 5 Drawing Sheets

(56) References Cited

OTHER PUBLICATIONS

"Considerations on Mode 2 enhancement for enhanced reliability and reduced latency", Xiaomi, 3GPP TSG RAN WG1 #103-e, R1-2009038, E-Meeting, Oct. 26-Nov. 13, 2020, 7 pages.

"Inter-UE coordination for mode 2 enhancement", ITL, KRRI, 3GPP TSG RAN WG1 #103-e, R1-2008892, e-Meeting, Oct. 26-Nov. 13, 2020, 8 pages.

Notice of Reasons for Refusal issued by the Japanese Patent Office on Jun. 26, 2024, in corresponding Application No. JP 2023-537308, 5 pages.

ZTE Corporation, Sanechips, "Discussion on sidelink inter-UE coordination", 3GPP TSG-RAN WG2 Meeting #112-e, R2-2009028, On-line, Nov. 2-13, 2020, 5 pages.

First Office Action for Chinese Application No. 202210977164.4, dated May 23, 2025, 14 pages.

Request for the Submission of an Opinion for Korean Application No. 10-2023-7024590, dated Aug. 12, 2025, 13 pages.

Samsung, "On Feasibility and Benefits for Mode2 Enhancements", 3GPP TSG RAN WG1 #103-e, R1-2008190, e-Meeting, Oct. 26-Nov. 13, 2020, 6 pages.

Fraunhofer HHI, Fraunhofer IIS, "Resource Allocation Enhancements for Mode 2", 3GPP TSG RAN WG1 #103-e, R1-2008757, e-Meeting, Oct. 26-Nov. 13, 2020, 9 pages.

\* cited by examiner

AUXILIARY RESOURCE SET DETERMINING METHOD AND APPARATUS, AND STORAGE MEDIUM

CROSS-REFERENCE TO RELATED APPLICATION

This application is a U.S. national phase of International Application No. PCT/CN2020/138068, filed Dec. 21, 2020, the entire content of which is incorporated herein by reference.

TECHNICAL FIELD

The present disclosure relates to a field of communication technology, and particularly to a method and an apparatus for determining an auxiliary resource set, and a storage medium.

BACKGROUND

Since the long term evolution (LTE), the third generation partnership (3GPP) has been formulating a sidelink (SL, also referred to as direct link) standard, which is served as a standard for terminal-to-terminal direct communication. In July 2020, a first standard for a new radio (NR) sidelink has been completed in Release 16 (hereinafter referred to as Rel-16), in which NR sidelink solutions are mainly used for vehicle to everything (V2X) and public security. For the V2X and the public security, due to time constraints, Release 16 does not fully support their service requirements and operating solutions, and service and system aspects (SA) make some enhancements in Release 17 NR sidelink, such as architecture enhancement and system enhancement for advanced V2X services supported by the 3GPP. In addition, in the SA workgroup, other business cases related to the NR sidelink are being studied, such as network-controlled interactive services, enhanced energy efficiency relays, wide coverage, and audio-visual service production. Therefore, at the 86th plenary meeting of the 3GPP, in a project of Release 17, the enhancement of the NR sidelink is taken as a work item, in order to enhance a reliability of sidelink transmission and reduce a delay.

In the enhancement of the NR sidelink, user equipment (UE) A in sidelink communication can send one auxiliary resource set to UE B with a resource selection mode of mode 2, and the UE B takes the auxiliary resource set in account in resource selection for its own data transmission. However, in the related art, when the UE A sends the auxiliary resource set, signaling overhead of sending the auxiliary resource set by the UE A is large due to a fact that the sensed auxiliary resource set has a large amount of resources.

SUMMARY

According to a first aspect of the present disclosure, a method for determining an auxiliary resource set is provided. The method is performed by a first device, and includes: determining an auxiliary resource set, in which the auxiliary resource set includes a part of time frequency resources in a candidate resource set sensed by the first device.

According to a second aspect of the present disclosure, a method for determining an auxiliary resource set is provided. The method is performed by a second device, and includes: receiving an auxiliary resource set, in which the auxiliary resource set includes a part of time frequency resources in a candidate resource set sensed by a first device.

According to a third aspect of present disclosure, an apparatus for determining an auxiliary resource set is provided, and includes:
a processor; and a memory configured to store instructions executable by the processor;
in which, the processor is configured to perform the method for determining an auxiliary resource set according to the first aspect or any one implementation of the first aspect.

According to a fourth aspect of the present disclosure, an apparatus for determining auxiliary resource set is provided, and includes:
a processor; and a memory configured to store instructions executable by the processor;
in which, the processor is configured to perform the method for determining an auxiliary resource set according to the second aspect or any one implementation of the second aspect.

According to a fifth aspect of the present disclosure, a non-transitory computer-readable storage medium having stored therein instructions that, when executed by a processor of a terminal, cause the terminal to perform the method for determining an auxiliary resource set according to the first aspect or any one implementation of the first aspect.

According to a sixth aspect of the present disclosure, a non-transitory computer-readable storage medium having stored therein instructions that, when executed by a processor of a terminal, cause the terminal to perform the method for determining an auxiliary resource set according to the second aspect or any one implementation of the second aspect.

It should be understood that the above general descriptions and following detailed descriptions are only illustrative and descriptive, and may not be a limitation of the present disclosure.

BRIEF DESCRIPTION OF THE DRAWINGS

The drawings herein are incorporated into the specification and is a part of the specification, embodiments in conformity with embodiments of the present disclosure are shown, and the principle of the present disclosure is explained together with the specification.

DETAILED DESCRIPTION

The example embodiments will be described in detail here, and examples thereof are shown in the accompanying drawings. When the following descriptions are referred to the accompanying drawings, unless otherwise indicated, the same numbers in different drawings represent the same or similar elements. The implementations described in the following example embodiments do not represent all implementations consistent with the present disclosure. Rather, they are merely examples of apparatuses and methods consistent with some aspects of the disclosure as detailed in the appended claims.

Figures 1, 2:
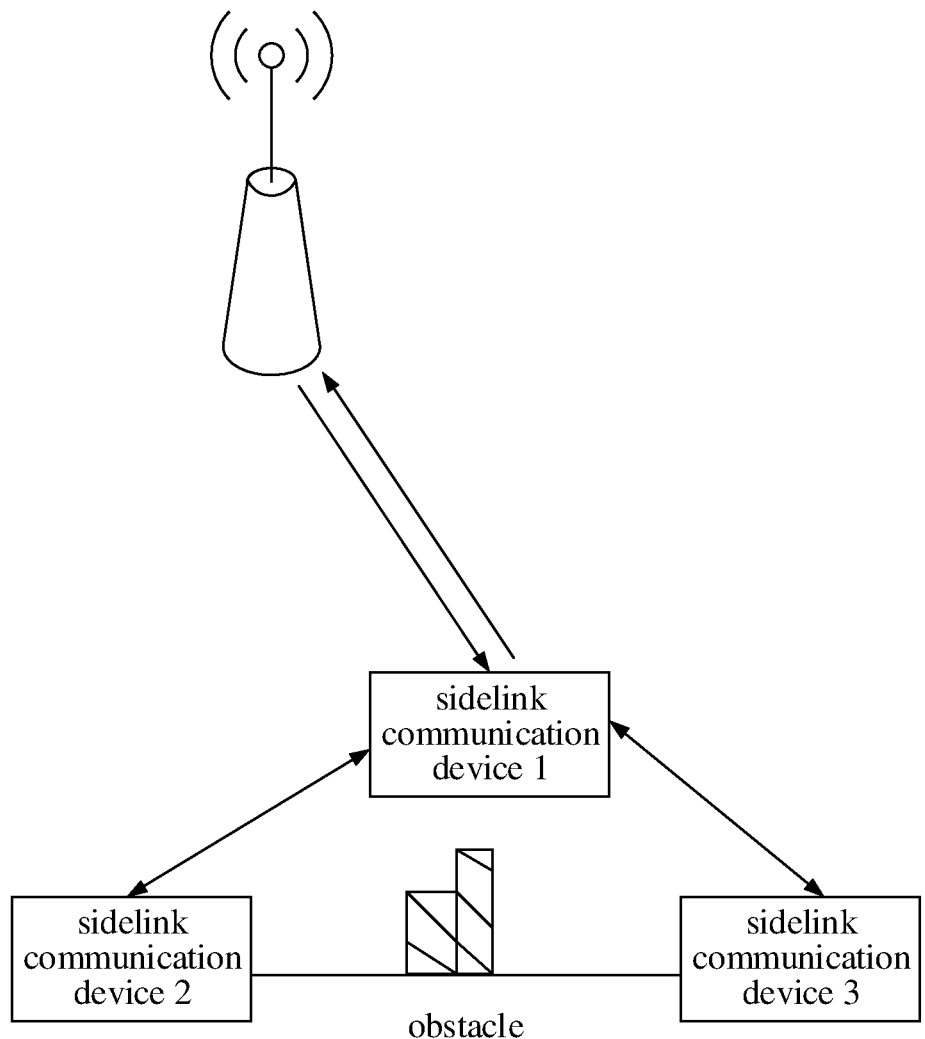
FIG. 1 is a diagram illustrating a communication system according to an embodiment.
FIG. 2 is a flowchart illustrating a method for determining an auxiliary resource set according to an embodiment.

A method for determining an auxiliary resource set provided in the embodiments of the present disclosure may be applied to a sidelink communication system shown in FIG. 1. Referring to FIG. 1, in a scenario where sidelink communication is performed between sidelink communication devices, a network device configures various transmission parameters for data transmission for a sidelink communication device 1. The sidelink communication device 1, a sidelink communication device 2 and a sidelink communication device 3 may perform the sidelink communication. There may be an obstacle between the sidelink communication device 2 and the sidelink communication device 3. Links for communications between the network device and the sidelink communication device are regarded as an uplink and a downlink, and a link between the sidelink communication devices is regarded as a sidelink.

In the present disclosure, a communication scenario of the sidelink communication between the sidelink communication devices may be a vehicle to everything (V2X) service scenario. V represents a vehicle-mounted device, and X represents any object interacting with the vehicle-mounted device. At present, X mainly includes a vehicle-mounted device, a handheld device, a traffic roadside infrastructure, and a network. The information interaction mode of V2X includes: vehicle to vehicle (V2V), vehicle to infrastructure (V2I), vehicle to pedestrian (V2P), and vehicle to network (V2N).

With the development of a new generation of 5G mobile communication technology, 5G NR technologies are used in 3GPP Rel-16 to support new V2X communication services and scenarios, such as vehicles platooning, extended sensors, advanced driving, remote driving, and the like. In general, the 5G V2X sidelink can provide a higher communication rate, a shorter communication delay, and a more reliable communication quality.

The communication scenario of the sidelink communication between the sidelink communication devices may also be a device to device (D2D) communication scenario. The sidelink communication devices performing the sidelink communication in the embodiments of the present disclosure may include various handheld devices, vehicle-mounted devices, wearable devices, computing devices with a wireless communication function, or other processing devices connected to a wireless modem, and various forms of user equipments (UEs), mobile stations (MS s), terminals, terminal equipments, and the like. For ease of description, the following embodiments in the present disclosure are illustrated by taking a sidelink communication device as a user equipment.

The enhancement of the NR sidelink may improve the reliability of transmission and reduce the delay. In the enhancement of the NR sidelink, in terms of enhancing resource allocation in mode 2, the 3GPP work group reaches a conclusion that it is necessary to study a way to assist selection of resources between UEs. In this way, two UEs are specified, for example, a UE A is an auxiliary UE of a UE B, and the UE B refers to the UE that needs to perform resource selection to send data. The UE A determines a resource set and sends the resource set to the UE B in the mode 2. The UE B takes the auxiliary resource set sent by the UE A into account in the resource selection. That is, it can be understood that the UE B uses a mechanism with the assistance of the auxiliary resource set to perform resource selection. The UE B may send data to the UE A and/or other UEs.

However, when the UE A sends the auxiliary resource set, if the UE A sends the sensed candidate auxiliary resource set to the UE B through a control signaling, and the sensed candidate auxiliary resource set has a large amount of resources, overhead of the control signaling is large.

In order to reduce the overhead of the control signaling, a method for determining an auxiliary resource set is provided in the embodiments of the present disclosure. In the method, the UE A selects a part of time frequency resources in the sensed candidate auxiliary resource set as an auxiliary resource subset, and reports the auxiliary resource subset to the UE B, which reduces the amount of resources reported to the UE B by the UE A, and assists the UE B in resource selection.

In the embodiments of the present disclosure, for ease of description, a device providing an auxiliary resource set is referred to as a first device, and a device using the mechanism with the assistance of the auxiliary resource set to perform the resource selection is referred to as a second device.

FIG. 2 is a flowchart illustrating a method for determining an auxiliary resource set according to an embodiment. As shown in FIG. 2, the method for determining an auxiliary resource set is applied in the first device, and includes the following steps.

At block S11, an auxiliary resource subset is determined.

The auxiliary resource subset includes a part of time frequency resources in a candidate auxiliary resource set sensed by the first device.

According to the method for determining an auxiliary resource set provided in the embodiment of the present disclosure, a part of the time frequency resources in the candidate auxiliary resource set sensed by the first device can be determined as the auxiliary resource subset, so that the amount of resources reported to the second device can be reduced, thus reducing signaling overhead.

Figure 3:
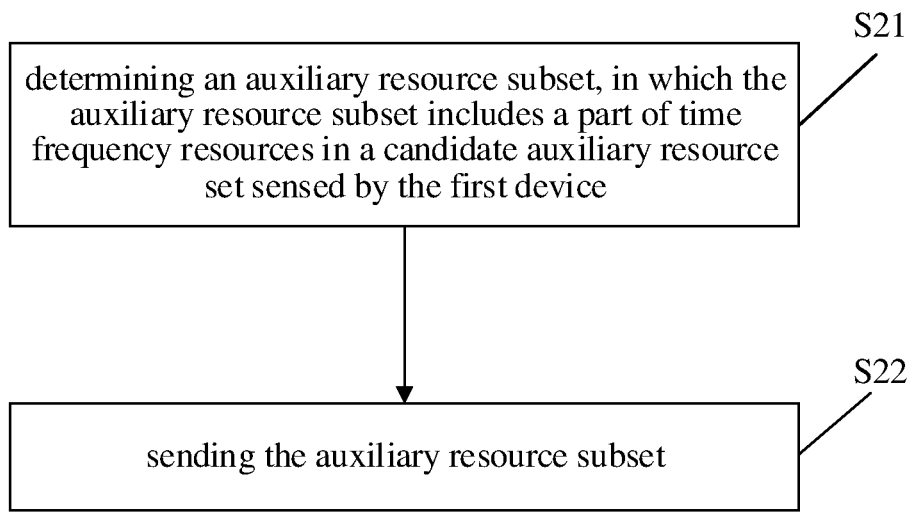
FIG. 3 is a flowchart illustrating a method for determining an auxiliary resource set according to an embodiment.

FIG. 3 is a flowchart illustrating a method for determining an auxiliary resource set according to an embodiment. As shown in FIG. 3, the method for determining an auxiliary resource set is applied in the first device, and includes the following steps.

At block S21, an auxiliary resource subset is determined.

The auxiliary resource subset includes a part of time frequency resources in a candidate auxiliary resource set sensed by the first device.

At block S22, the auxiliary resource subset is sent.

According to the method for determining an auxiliary resource set provided in the embodiment of the present disclosure, a part of the time frequency resources in the candidate auxiliary resource set sensed by the first device can be determined as the auxiliary resource subset, and the auxiliary resource subset is sent to the second device, so that the amount of resources reported to the second device can be reduced, thus reducing signaling overhead.

In the embodiment of the present disclosure, the second device may receive the auxiliary resource subset sent by the first device. When performing resource selection, the second device takes the auxiliary resource subset sent by the first device into account, and uses the mechanism with the assistance of the auxiliary resource set to perform the resource selection.

Figure 4:
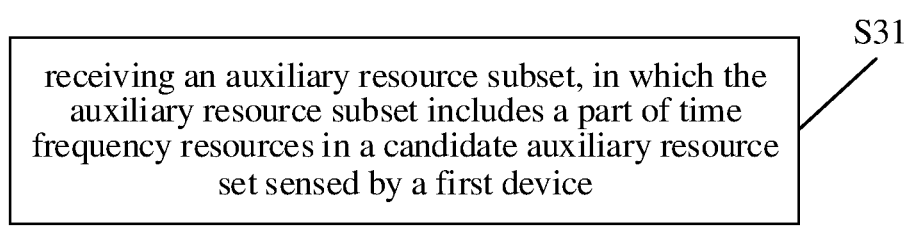
FIG. 4 is a flowchart illustrating a method for determining an auxiliary resource set according to an embodiment.

FIG. 4 is a flowchart illustrating a method for determining an auxiliary resource set according to an embodiment. As shown in FIG. 4, the method for determining the auxiliary resource set is applied in the second device, and includes the following steps.

At block S31, an auxiliary resource subset is received.

The auxiliary resource subset includes a part of time frequency resources in a candidate auxiliary resource set sensed by the first device.

In the embodiment of the present disclosure, the second device receives the auxiliary resource subset. The auxiliary resource subset includes a part of the time frequency resources in the candidate auxiliary resource set sensed by the first device, which can reduce signaling overhead of the second device receiving the auxiliary resource set.

In the embodiments of the present disclosure, the auxiliary resource subset sent by the first device and/or the auxiliary resource subset received by the second device will be described below.

In an implementation, in the method for determining an auxiliary resource set provided in an embodiment of the present disclosure, the auxiliary resource subset may be a resource list (list).

In the embodiment of the present disclosure, the list serving as the auxiliary resource subset has a list length, hereinafter referred to as a first list length.

In the method for determining an auxiliary resource set provided in the embodiment of the present disclosure, the first device may report the auxiliary resource subset in a format of a list, and report the list with the first list length. It is assumed that the first list length is L. The first device reports the auxiliary resource subset in the format of the list, and reports the auxiliary resource subset with the list length of L.

In the method for determining an auxiliary resource set provided in the embodiment of the present disclosure, the second device may receive the list with the list length of L, and determine the auxiliary resource subset based on the list.

In the method for determining an auxiliary resource set provided in the embodiment of the present disclosure, the first list length of the auxiliary resource subset in the format of the list may be a constant list length. For example, the first list length is a pre-configured constant list length.

In the embodiment of the present disclosure, when the first device determines the auxiliary resource subset, the auxiliary resource subset may be determined based on a resource selection window of the second device. The second device sends an auxiliary request carrying the resource selection window of the second device to the first device through a control signaling. The first device numbers one or more resources in the sensed candidate auxiliary resource set and within the resource selection window of the second device to form the list. A numbering mode of the list is agreed by the first device and the second device in advance. In other words, both the first device and the second device can determine the list and serial numbers in the list. The serial numbers in the list are numbered at granularity of a frequency domain unit in a frequency domain and at granularity of a time domain unit in a time domain. The frequency domain unit may be a channel, a subchannel, a subband, a band, or the like. The time domain unit may be a slot, a radio frame, a subframe, a mini-slot, a symbol, a transmission time interval (TTI), or the like. In the embodiments of the present disclosure, the serial numbers in the list are numbered at granularity of a subchannel in the frequency domain, and are numbered at granularity of a time slot in the time domain, but the present disclosure is not limited thereto.

In the method for determining an auxiliary resource set provided in the embodiment of the present disclosure, on one hand, the auxiliary resource subset may include one or more time frequency resources conforming to the first list length and randomly selected from the candidate auxiliary resource set. That is, in an embodiment of the present disclosure, the first device may randomly select one or more time frequency resources conforming to the first list length from the candidate auxiliary resource set as the auxiliary resource subset.

Figure 5:
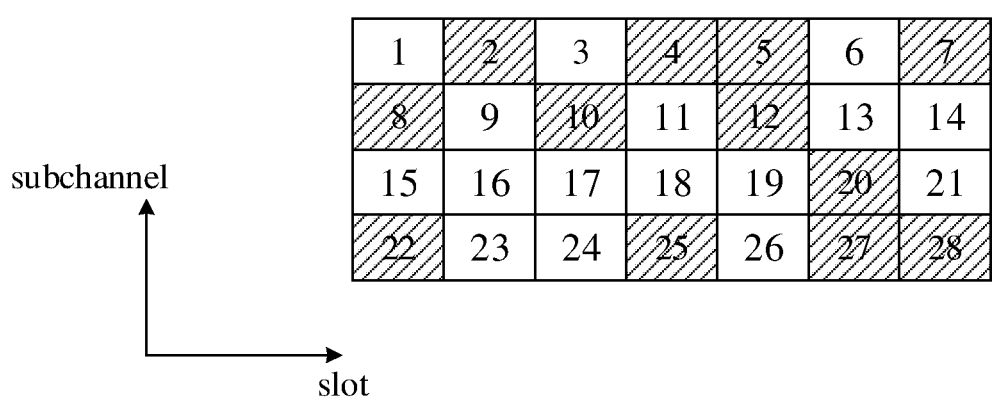
FIG. 5 is a diagram illustrating an embodiment of the present disclosure, in which a first device randomly selects one or more time frequency resources conforming to a first list length from a candidate auxiliary resource set sensed by the first device as an auxiliary resource set.

FIG. 5 is a diagram illustrating an embodiment of the present disclosure in which the first device randomly selects one or more time frequency resources conforming to a first list length from a candidate auxiliary resource set sensed by the first device as an auxiliary resource set. Referring to FIG. 5, resources in the candidate auxiliary resource set sensed by the first device are numbered at granularity of the subchannel in the frequency domain and at granularity of the slot in the time domain. Referring to FIG. 5, the one or more time frequency resources in the list compose the candidate auxiliary resource set sensed by the first device. Assuming that the first list length L=8 is pre-configured, the first device randomly reports a list with the list length of 8 from the candidate auxiliary resource set. For example, the time frequency resources numbered {2, 4, 5, 7, 8, 10, 12, 20} may be randomly selected as the auxiliary resource subset and sent to the second device.

In the method for determining an auxiliary resource set provided in the embodiment of the present disclosure, on the other hand, the auxiliary resource subset may include the one or more time frequency resources selected from the candidate auxiliary resource set based on a reference signal receiving power (RSRP), and the one or more time frequency resources conform to the first list length. That is, the first device selects, based on the RSRP, the one or more time frequency resources conforming to the first list length from the sensed candidate auxiliary resource set as the auxiliary resource subset.

In an implementation, the first device selects the one or more time frequency resources conforming to the first list length from the candidate auxiliary resource set based on an ascending order of values of the RSRP.

Figure 6:
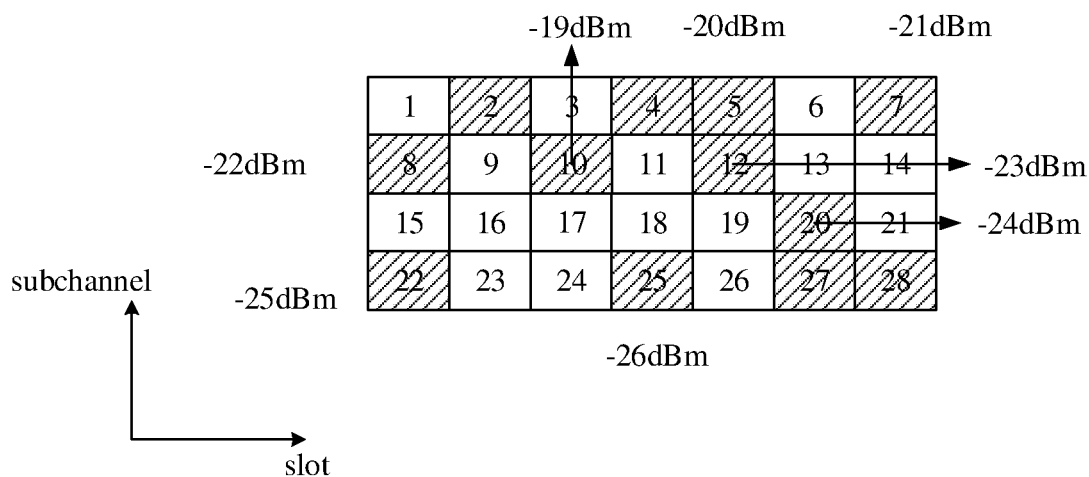
FIG. 6 is a diagram illustrating an embodiment of the present disclosure, in which a first device selects one or more time frequency resources conforming to a first list length from a sensed candidate auxiliary resource set based on a RSRP as an auxiliary resource subset.

FIG. 6 shows a diagram illustrating an embodiment of the present disclosure, in which the first device selects one or more time frequency resources conforming to a first list length from a sensed candidate auxiliary resource set based on RSRP as an auxiliary resource subset. Referring to FIG. 6, within a time period Tproc,0 of the candidate auxiliary resource set sensed by the first device, the RSRP values of the demodulation reference signal (DMRS) of the physical sidelink control channel (PSCCH) measured on the monitored resources are sorted in an ascending order, and one or more resources with a low RSRP value are preferentially selected. According to a pre-configured list length L of the reported list, the first device selects resources with a list length of 8 and a low RSRP value, such as resources numbered {5, 7, 8, 10, 12, 20, 22, 25}. These time frequency resources have minimal interference for data transmission by the second device. For example, the time frequency resources numbered {5, 7, 8, 10, 12, 20, 22, 25} are used as the auxiliary resource subset and sent to the second device.

According to the method for determining an auxiliary resource set involved in the embodiment of the present disclosure, the first list length L of the reported list is pre-configured, and the first device reports the auxiliary resource set with the length of L in the candidate auxiliary resource set sensed by the first device as the auxiliary resource subset.

In the method for determining an auxiliary resource set provided in the embodiment of the present disclosure, on one hand, the first list length of the list may be a pre-configured constant list length; on the other hand, the first list length may also be flexibly and dynamically changed.

In an implementation, the first list length in the embodiment of the present disclosure is determined based on a minimum proportion satisfied by a proportion of resources in the candidate auxiliary resource set to the resources within a resource selection window of the second device.

In the embodiment of the present disclosure, for ease of description, the minimum proportion satisfied by the proportion of the resources in the candidate auxiliary resource set to the resources within the resource selection window of the second device is referred to as a first proportion. Based on a communication protocol Rel-16, in order to ensure a randomness of the resource selection, the proportion of the resources in the candidate auxiliary resource set determined by step 1 of resource sensing to the resources within the resource selection window needs to meet a requirement of ≥X % (i.e., the first proportion). X % is specified according to the protocol, which ensures more resources, and meets the randomness of the resource selection.

In an implementation, in the method for determining an auxiliary resource set provided in the embodiment of the present disclosure, a proportion offset value (Y %) relative to the first proportion may be set. The first list length is determined based on the proportional offset value relative to the first proportion.

In an example, in the embodiment of the present disclosure, the first list length may be determined based on the number of the resources within the resource selection window of the second device, the first proportion, and the proportion offset value relative to the first proportion. For example, the first device determines the first list length by a formula of L=S*(X %+Y %). S is the number of resources within the resource selection window of the UE B, X % is the first proportion, Y % is the proportion offset value relative to the first proportion, and L is the first list length.

In the embodiment of the present disclosure, the proportion offset value Y % relative to the first proportion is pre-configured through radio resource control (RRC). The number S of resources within the resource selection window of the UE B is calculated based on a position of the resource selection window. The first device obtains the position of the resource selection window based on the auxiliary request of the second device.

In the embodiment of the present disclosure, the first device calculates the first list length of the list, and notifies the second device the determined list through a control signaling. The first device randomly selects an auxiliary resource subset with a list length of L from the sensed candidate auxiliary resource set, and reports the auxiliary resource subset to the second device. The first list length is determined based on the number of resources within the resource selection window of the second device, the first proportion and the proportion offset value relative to the first proportion, so that the reported first list length varies with the number of resources in the candidate auxiliary resource set sensed by the first device, and the solution is more flexible.

Figure 7:
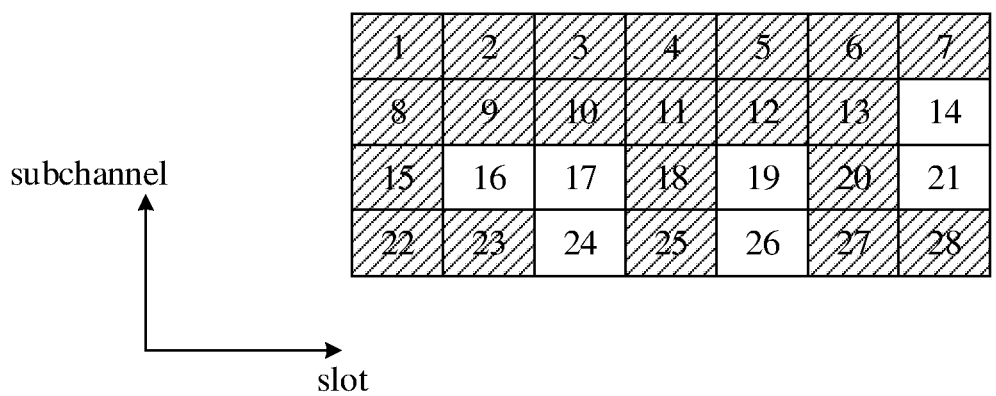
FIG. 7 is a diagram illustrating a traditional technology of determining a candidate auxiliary resource set.

In a feasible example, it is assumed that the first proportion X % is 40%. When the first device senses the candidate auxiliary resource set, the resource proportion finally determined needs to be greater than X %. For example, in the embodiment of the present disclosure, the proportion of the candidate auxiliary resource set is set as 75%. FIG. 7 is a diagram illustrating a traditional technology, in which a candidate auxiliary resource set is determined. Referring to FIG. 7, the first device needs to select 21 time frequency resources from 28 time frequency resources as auxiliary resources and send the auxiliary resources to the second device.

Figure 8:
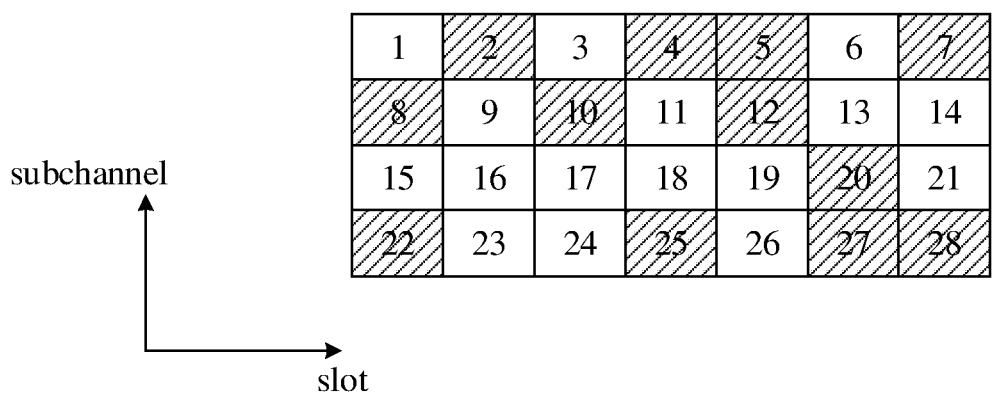
FIG. 8 is a diagram illustrating an embodiment of the present disclosure, in which a first device determines a first list length based on a number of resources within a resource selection window of a second device, a first proportion, and a proportion offset value relative to the first proportion, and determines an auxiliary resource set.

FIG. 8 is a diagram illustrating an embodiment of the present disclosure, in which the first device determines a first list length based on the number of resources within a resource selection window of the second device, a first proportion, and a proportion offset value relative to the first proportion and determines an auxiliary resource set. Referring to FIG. 8, in the embodiment of the present disclosure, when the first device determines an auxiliary resource subset, the selected resources need to meet a requirement of larger than the first proportion X % and less than (X %+Y %). Assuming that the first proportion X % is 40% and (X %+Y %) is 50%, the first device may select 12 time frequency resources from the 28 time frequency resources as the auxiliary resources and send the auxiliary resources to the second device.

Compared to the solution of selecting 21 time frequency resources from the 28 time frequency resources as auxiliary resources and sending the auxiliary resources to the second device, the first device may select 12 time frequency resources from 28 time frequency resources as auxiliary resources and send the auxiliary resources to the second device, which can reduce the amount of reported auxiliary resources, thus reducing signaling overhead.

In the method for determining an auxiliary resources provided in the embodiment of the present disclosure, the first device may determine the auxiliary resource subset based on the resource selection window of the second device.

In an implementation, the auxiliary resource subset includes one or more time frequency resources with a first slot length within the resource selection window of the second device. The first slot length is less than a slot length of the resource selection window of the second device.

In an implementation, the auxiliary resource set includes one or more continuous time frequency resources determined based on a first time and having the first slot length. The first time is a start time or an end time of the resource selection window of the second device.

Figure 9:
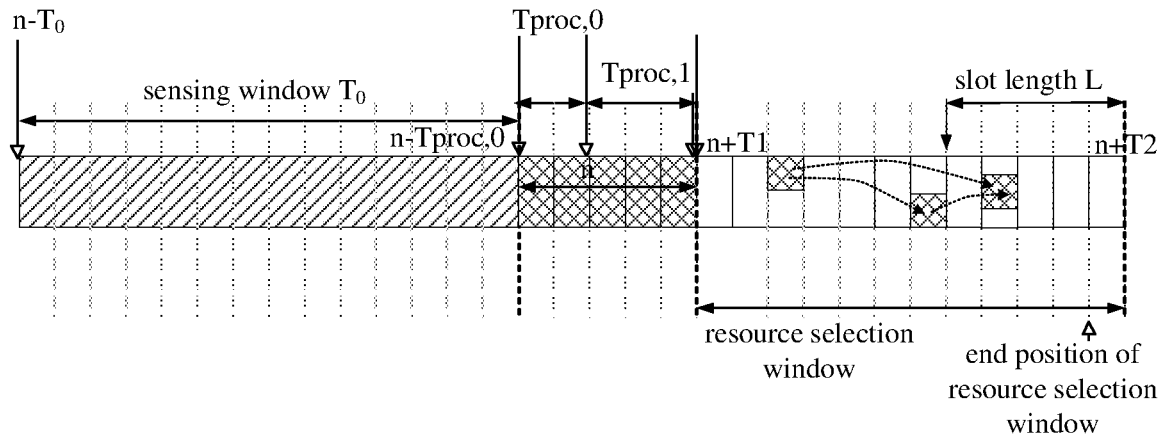
FIG. 9 is a diagram illustrating an embodiment of the present disclosure, in which a first device determines an auxiliary resource subset based on a resource selection window of a second device.

FIG. 9 is a diagram illustrating an embodiment of the present disclosure, in which the first device determines an auxiliary resource subset based on a resource selection window of the second device. Referring to FIG. 9, the UE A selects the time frequency resources with a constant slot length of L (L≤the number of slots of the resource selection window of the UE B, and the value of L is pre-configured through the RRC) before the time slot n+T2 as the auxiliary resource subset, and reports the auxiliary resource subset to the UE B. The time slot n+T2 is an end position of the resource selection window of the UE B.

The position of the time slot n+T2 at the end position of the resource selection window of the UE B is notified to the UE A by the UE B in an auxiliary request through a control signaling. The value of the slot length L is pre-configured by the RRC signaling.

It can be understood that in the embodiment of the present disclosure, the resource selection window [n+T1, n+T2] of the UE B is known to the UE A. The UE A senses the time frequency resources within the resource selection window of the UE B. The UE A selects the time frequency resources with the time slot length of L as the auxiliary resource subset and reports the auxiliary resource subset to the UE B. That is, a time frequency resource subset of the time frequency resources located in the resource selection window of the UE B is reported.

According to the method for determining an auxiliary resource set provided in the embodiment of the present disclosure, the first device selects one or more resources with a slot length less than the slot length of the resource selection window of the second device within the resource selection window of the second device as the auxiliary resource subset, and sends the auxiliary resource subset to the second device, which can reduce the amount of auxiliary resources to be sent, thus reducing signaling overhead.

It can be understood that the method for determining an auxiliary resource set provided in the embodiment of the present disclosure may be applied to an interaction process of sending and receiving the auxiliary resource set between the first device and the second device. For the process of sending and receiving the auxiliary resource set implemented between the first device and the second device in an interaction way, the first device and the second device have corresponding functions for implementing the method for determining an auxiliary resource set involved in the above embodiments, which are not elaborated in the embodiments of the present disclosure.

Based on a same concept, an apparatus for determining an auxiliary resource set is also provided in the embodiments of the present disclosure.

It can be understood that, in order to implement the above-mentioned functions, the transmission configuration apparatus provided by the embodiments of the present disclosure includes corresponding hardware structures and/or software modules for executing respective functions. In combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 10:
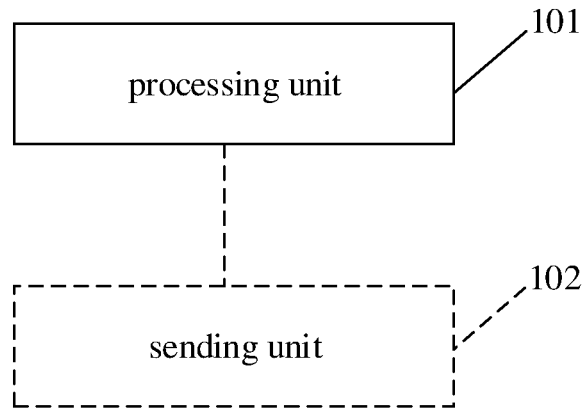
FIG. 10 is a block diagram illustrating an apparatus for determining an auxiliary resource set according to an embodiment.

FIG. 10 is a block diagram illustrating an apparatus for determining an auxiliary resource set according to an embodiment. Referring to FIG. 10, the apparatus 100 for determining an auxiliary resource set is applied to a first device, and includes a processing unit 101.

The processing unit 101 is configured to determine an auxiliary resource subset. The auxiliary resource subset includes a part of time frequency resources in a candidate auxiliary resource set sensed by the first device.

In an implementation, the auxiliary resource subset is a resource list having a first list length.

In an implementation, the auxiliary resource subset includes one or more time frequency resources conforming to the first list length and randomly selected from candidate auxiliary resource set.

In an implementation, the auxiliary resource subset includes one or more time frequency resources selected from the candidate auxiliary resource set based on a reference signal receiving power, and the one or more time frequency resources conform to the first list length.

In an implementation, the auxiliary resource subset includes one or more time frequency resources selected from the candidate auxiliary resource set based on the ascending order of values of the reference signal receiving power, and the one or more time frequency resources conform to first list length.

In an implementation, the first list length is a pre-configured constant list length.

In an implementation, the first list length is determined based on the proportion offset value relative to the first proportion, and the first proportion is the minimum proportion satisfied by the proportion of the resources in candidate auxiliary resource set to the resources within the resource selection window of the second device.

In an implementation, the first list length is determined based on the number of the resources within the resource selection window of the second device, the first proportion, and the proportion offset value relative to the first proportion.

In an implementation, the auxiliary resource subset includes one or more time frequency resources with a first slot length within a resource selection window of a second device, and the first slot length is less than the slot length of the resource selection window of the second device.

In an implementation, the auxiliary resource set is includes one or more continuous time frequency resources with the first slot length and determined based on a first time.

In an implementation, the first time is a start time or an end time of the resource selection window.

In an implementation, the apparatus 100 for determining an auxiliary resource set includes a sending unit 102. The sending unit 102 is configured to send the auxiliary resource subset.

Figure 11:
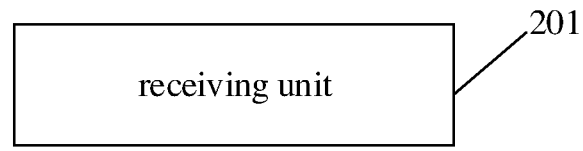
FIG. 11 is a block diagram illustrating an apparatus for determining an auxiliary resource set according to an embodiment.

FIG. 11 is a block diagram illustrating an apparatus for determining an auxiliary resource set according to an embodiment. Referring to FIG. 11, the apparatus 200 for determining an auxiliary resource set is applied to a second device, and includes a receiving unit 201.

The receiving unit 201 is configured to receive the auxiliary resource subset. The auxiliary resource subset includes a part of time frequency resources in a candidate auxiliary resource set sensed by the first device.

In an implementation, the auxiliary resource subset is a resource list having a first list length.

In an implementation, the auxiliary resource subset includes one or more time frequency resources conforming to the first list length and randomly selected from candidate auxiliary resource set.

In an implementation, the auxiliary resource subset includes one or more time frequency resources selected from the candidate auxiliary resource set based on a reference signal receiving power, and the one or more time frequency resources conform to the first list length.

In an implementation, the auxiliary resource subset includes one or more time frequency resources selected from candidate auxiliary resource set based on an ascending order of values of the reference signal receiving power, and the one or more time frequency resources conform to first list length.

In an implementation, the first list length is a pre-configured constant list length.

In an implementation, the first list length is determined based on a proportion offset value relative to a first proportion, and the first proportion is a minimum proportion satisfied by a proportion of resources in candidate auxiliary resource set to resources within a resource selection window of the second device.

In an implementation, the first list length is determined based on a number of the resources within the resource selection window of the second device, the first proportion, and the proportion offset value relative to the first proportion.

In an implementation, the auxiliary resource subset includes one or more time frequency resources with a first slot length within a resource selection window of the second device, and the first slot length is less than a slot length of the resource selection window of the second device.

In an implementation, the auxiliary resource set includes one or more continuous time frequency resources with the first slot length and determined based on a first time.

In an implementation, the first time is a start time or an end time of the resource selection window.

With regard to the apparatus in the above embodiments, the specific way in which each module performs the operation has been described in detail in the embodiments of the method and will not be elaborated here.

Figure 12:
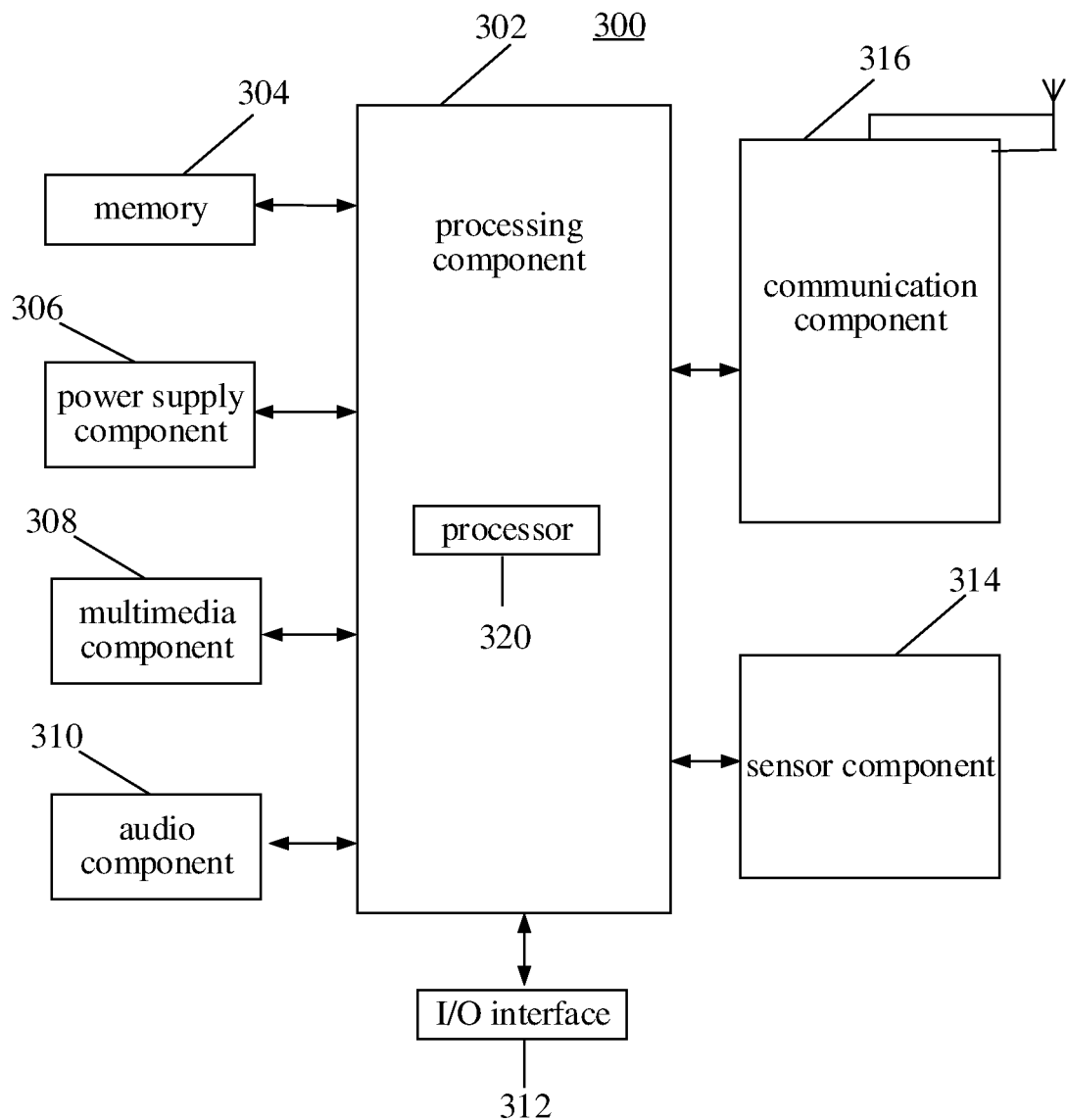
FIG. 12 is a block diagram illustrating an apparatus for determining an auxiliary resource set according to an embodiment.

FIG. 12 is a block diagram illustrating an apparatus 300 for determining an auxiliary resource set according to an embodiment. For example, the apparatus 300 may be a mobile phone, a computer, a digital broadcasting terminal, a messaging device, a game console, a tablet device, a medical equipment, a fitness equipment, a personal digital assistant, etc.

Referring to FIG. 12, the apparatus 300 may include one or more components: a processing component 302, a memory 304, a power supply component 306, a multimedia component 308, an audio component 310, an input/output (I/O) interface 312, a sensor component 314, and a communication component 316.

The processing component 302 generally controls the whole operation of the apparatus 300, such as the operations related to display, phone call, data communication, camera operation and recording operation. The processing component 302 may include one or more processors 320 to perform instructions, to complete all or part of steps of the above method. In addition, the processing component 302 may include one or more modules for the convenience of interaction between the processing component 302 and other components. For example, the processing component 302 may include a multimedia module for the convenience of interaction between the multimedia component 308 and the processing component 302.

The memory 304 is configured to store all types of data to support the operation of the apparatus 300. Examples of the data include the instructions of any applications or methods operated on the apparatus 300, contact data, phone book data, messages, pictures, videos, etc. The memory 304 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 306 may provide power supply for all components of the apparatus 300. The power supply component 306 may include power supply management system, one or more power supplies, and other units related to generating, managing and distributing power for the apparatus 300.

The multimedia component 308 includes an output interface screen provided between the apparatus 300 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touching, sliding and gestures on the touch panel. The touch sensor may not only sense the boundary of touch or slide action, but also detect the duration and pressure related to the touching or sliding operation. In some embodiments, the multimedia component 308 includes a front camera and/or a rear camera. When the apparatus 300 is in operation mode, such as shooting mode or video mode, the front camera or the rear camera may receive the external multimedia data. Each front camera and rear camera may be a fixed optical lens system or an optical lens system with focal length and optical zoom capacity.

The audio component 310 is configured as an output and/or input signal. For example, the audio component 310 includes a microphone (MIC). When the apparatus 300 is in operation mode, such as call mode, record mode, and speech recognition mode, the microphone is configured to receive the external audio signals. The audio signals received may be further stored in the memory 304 or sent via the communication component 316. In some embodiments, the audio component 310 further includes a speaker configured to output an audio signal.

The I/O interface 312 provides an interface for the processing component 302 and the peripheral interface module, and the peripheral interface module may be a keyboard, a click wheel, a button, etc. The buttons may include but not limited to a home button, a volume button, a start button and a lock button.

The sensor component 314 includes one or more sensors, configured to provide various aspects of status assessment for the apparatus 300. For example, the sensor component 314 may detect the on/off state of the apparatus 300 and the relative positioning of the component. For example, the component is a display and a keypad of the apparatus 300. The sensor component 314 may further detect the location change of the apparatus 300 or one component of the apparatus 300, the presence or absence of contact between the user and the apparatus 300, the orientation or acceleration/deceleration of the apparatus 300, and the temperature change of the apparatus 300. The sensor component 314 may include a proximity sensor, which is configured to detect the existence of the objects nearby without any physical contact. The sensor component 314 may further include a light sensor such as CMOS or CCD image sensor, which is configured to use in imaging applications. In some embodiments, the sensor component 314 may further include an acceleration transducer, a gyroscope sensor, a magnetic sensor, a pressure sensor or a temperature sensor.

The communication component 316 is configured for the convenience of wire or wireless communication between the apparatus 300 and other devices. The apparatus 300 may access wireless networks based on communication standard, such as WiFi, 2G or 3G, or their combination. In an exemplary embodiment, the communication component 316 receives broadcast signals or broadcast-related information from an external broadcast management system via a broadcast channel. In an exemplary embodiment, the communication component 316 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an exemplary embodiment, the apparatus 300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an example embodiment, a non-temporary computer readable storage medium is further provided which includes instructions, such as the memory 304 including instructions. The instructions may be executed by the processor 320 of the apparatus 300 to complete the above methods. For example, the non-transitory computer readable storage medium may be a ROM, a random access memory (RAM), a CD-ROM, a magnetic tape, a floppy disk, an optical data storage device, etc.

It may be further understood that, "a plurality of" in the present disclosure means two or above, which is similar to other quantifiers. "and/or", describes the relationship of the association objects, indicating that there may exist three relationships, for example, A and/or B, may represent: any of existing A only, existing both A and B, or existing B only. The character "/" generally means the contextual object is a kind of "or" relationship. The singular forms "a", "the" and "said are also intended to include plural forms, unless the context clearly indicates otherwise.

It should be further understood that, although the terms "first", "second", "third", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this present disclosure, first information may also be referred to as second information, and similarly, and second information may also be referred to as first information.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

After considering the specification and practicing the disclosure herein, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

The invention claimed is:

1. A method for determining an auxiliary resource set, performed by a first device, comprising:
   determining an auxiliary resource set, wherein the auxiliary resource set comprises a part of time frequency resources in a candidate resource set sensed by the first device;
   wherein one or more time frequency resources having a first slot length within a resource selection window of a second device are determined as the auxiliary resource set, the first slot length is equal to a slot length of the resource selection window of the second device, and the first slot length corresponds to a start time or an end time of the resource selection window.

2. The method of claim 1, wherein the auxiliary resource set is a resource list.

3. The method of claim 1, further comprising:
   sending the auxiliary resource set.

4. A non-transitory computer-readable storage medium having stored therein instructions that, when executed by a processor of a terminal, cause the terminal to perform the method of claim 1.

5. A method for determining an auxiliary resource set, performed by a second device, comprising:
   receiving an auxiliary resource set, wherein the auxiliary resource set comprises a part of time frequency resources in a candidate resource set sensed by a first device;
   wherein one or more time frequency resources having a first slot length within a resource selection window of the second device are determined as the auxiliary resource set, the first slot length is equal to a slot length of the resource selection window of the second device, and the first slot length corresponds to a start time or an end time of the resource selection window.

6. The method of claim 5, wherein the auxiliary resource set is a resource list.

7. A non-transitory computer-readable storage medium having stored therein instructions that, when executed by a processor of a terminal, cause the terminal to perform the method of claim 5.

8. A second device, comprising:
a processor; and
a memory for storing instructions executable by the processor;
wherein the instructions instruct the processor to perform the method of claim 5.

9. A first device, comprising:
a processor; and
a memory for storing instructions executable by the processor;
wherein the processor is configured to:
determine an auxiliary resource set, wherein the auxiliary resource set comprises a part of time frequency resources in a candidate resource set sensed by the first device;
wherein one or more time frequency resources having a first slot length within a resource selection window of a second device are determined as the auxiliary resource set, the first slot length is equal to a slot length of the resource selection window of the second device, and the first slot length corresponds to a start time or an end time of the resource selection window.

10. The first device of claim 9, wherein the auxiliary resource set is a resource list.

11. The first device of claim 9, wherein the processor is further configured to:
send the auxiliary resource set.

* * * * *